US010062003B2

(12) United States Patent
Sala et al.

(10) Patent No.: US 10,062,003 B2
(45) Date of Patent: *Aug. 28, 2018

(54) REAL-TIME, MODEL-BASED OBJECT DETECTION AND POSE ESTIMATION

(71) Applicant: Microsoft Technology Licensing, LLC, Redmond, WA (US)

(72) Inventors: Pablo Sala, Bothell, WA (US); Norberto Goussies, Buenos Aires (AR)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/812,539

(22) Filed: Nov. 14, 2017

(65) Prior Publication Data

US 2018/0068202 A1    Mar. 8, 2018

Related U.S. Application Data

(63) Continuation of application No. 14/749,189, filed on Jun. 24, 2015, now Pat. No. 9,818,043.

(51) Int. Cl.
*G06K 9/52* (2006.01)
*G06T 19/00* (2011.01)
(Continued)

(52) U.S. Cl.
CPC .............. *G06K 9/52* (2013.01); *G06K 9/6201* (2013.01); *G06T 7/75* (2017.01); *G06T 19/006* (2013.01); *G06T 2207/10028* (2013.01)

(58) Field of Classification Search
CPC ....... G06K 9/52; G06K 9/6201; G06T 19/006
See application file for complete search history.

(56) References Cited

U.S. PATENT DOCUMENTS 7,706,603 B2   4/2010   Najafi et al.
8,379,014 B2   2/2013   Wiedemann et al.
(Continued)

OTHER PUBLICATIONS

"International Preliminary Report on Patentability Issued in PCT Application No. PCT/US2016/032955", dated Feb. 2, 2017, 9 Pages.
(Continued)

*Primary Examiner* — Kee M Tung
*Assistant Examiner* — Grace Q Li
(74) *Attorney, Agent, or Firm* — Lempia Summerfield Katz LLC

(57) ABSTRACT

A system includes a memory and a processor configured to select a set of scene point pairs, to determine a respective feature vector for each scene point pair, to find, for each feature vector, a respective plurality of nearest neighbor point pairs in feature vector data of a number of models, to compute, for each nearest neighbor point pair, a respective aligning transformation from the respective scene point pair to the nearest neighbor point pair, thereby defining a respective model-transformation combination for each nearest neighbor point pair, each model-transformation combination specifying the respective aligning transformation and the respective model with which the nearest neighbor point pair is associated, to increment, with each binning of a respective one of the model-transformation combinations, a respective bin counter, and to select one of the model-transformation combinations in accordance with the bin counters to detect an object and estimate a pose of the object.

20 Claims, 4 Drawing Sheets

(51) Int. Cl.
*G06K 9/62* (2006.01)
*G06T 7/73* (2017.01)

(56) References Cited

U.S. PATENT DOCUMENTS

| | | | |
|---|---|---|---|
| 8,553,989 | B1 | 10/2013 | Owechko et al. |
| 8,606,774 | B1 | 12/2013 | Makadia et al. |
| 8,830,229 | B2 | 9/2014 | Drost et al. |
| 8,855,366 | B2 | 10/2014 | Wagner et al. |
| 8,913,792 | B2 | 12/2014 | BenHimane et al. |
| 8,942,515 | B1 | 1/2015 | Huang |
| 2006/0120590 | A1 | 6/2006 | Han et al. |
| 2014/0105506 | A1 | 4/2014 | Drost et al. |
| 2015/0006117 | A1 | 1/2015 | Zhang et al. |

OTHER PUBLICATIONS

"International Search Report and Written Opinion Issued in PCT Application No. PCT/US2016/032955", dated Aug. 10, 2016, 12 Pages.

"Written Opinion of the International Preliminary Examining Authority issued in PCT Application No. PCT/US2016/032955", dated Nov. 3, 2016, 8 pages.

Aldoma, et al., "CAD-Model Recognition and 6DOF Pose Estimation using 3D Cues", In proceedings of IEEE International Conference on Computer Vision Workshops, Nov. 6, 2011, pp. 585-592.

Aldoma, et al., "Point Cloud Library: Three-Dimensional Object Recognition and 6 DOF Pose Estimation", In Journal of IEEE Robotics & Automation Magazine, vol. 19, Issue 3, Sep. 10, 2012, pp. 80-91.

Choi et al., "Voting-Based Pose Estimation for Robotic Assembly Using a 3D Sensor", In Proceedings of IEEE International Conference on Robotics and Automation, May 14, 2008, 8 pages.

Choi, et al., "3D Pose Estimation of Daily Objects using an RGB-D Camera", In Proceedings of IEEE/RSJ International Conference on Intelligent Robots and Systems (IROS), Oct. 7, 2012, pp. 3342-3349.

Drost et al., "Model Globally, Match Locally: Efficient and Robust 3D Object Recognition", In Proceedings of IEEE Conference on Computer Vision and Pattern Recognition, Jun. 13, 2010, 8 pages.

Hinterstoisser et al., "Model Based Training, Detection and Pose Estimation of Texture-Less 3D Objects in Heavily Cluttered Scenes", In Proceedings of 11th Asian Conference on Computer Vision, Nov. 5, 2012, 14 pages.

Lai et al., "Detection-Based Object Labeling in 3D Scenes", In Proceedings of IEEE International Conference on Robotics and Automation, May 14, 2012, 8 pages.

Luis A. Alexandre, "3D Descriptors for Object and Category Recognition: A Comparative Evaluation", In Proceedings of IEEE/RSJ International Conference on Intelligent Robots and Systems, Oct. 7, 2012, 6 pages.

Nguyen, et al., "Determination of 3D Object Pose in Point Cloud with CAD Model", In Proceedings of 21st Korea-Japan Joint Workshop on Frontiers of Computer Vision, IEEE, Jan. 28, 2015, 6 Pages.

Oliver J. Woodford et al., "Demisting the Hough Transform for 3D Shape Recognition and Registration", Proceedings of the British Machine Vision Conference 2011, Aug. 29, 2011, pp. 1-11.

Pauwels et al., "Real-time Model-based Articulated Object Pose Detection and Tracking with Variable Rigidity Constraints", In Proceedings of the IEEE Computer Society Conference on Computer Vision and Pattern Recognition, Jun. 23, 2014, 8 pages.

Pham et al., "A New Distance for Scale-Invariant 3D Shape Recognition and Registration", In Proceedings of IEEE International Conference on Computer Vision, Nov. 6, 2011, 8 pages.

REAL-TIME, MODEL-BASED OBJECT DETECTION AND POSE ESTIMATION

CROSS-REFERENCE TO RELATED APPLICATION

This application is a continuation application of co-pending U.S. patent application Ser. No. 14/749,189, entitled "Real-Time, Model-Based Object Detection and Pose Estimation" and filed on Jun. 24, 2015, the entire disclosure of which is hereby incorporated by reference.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
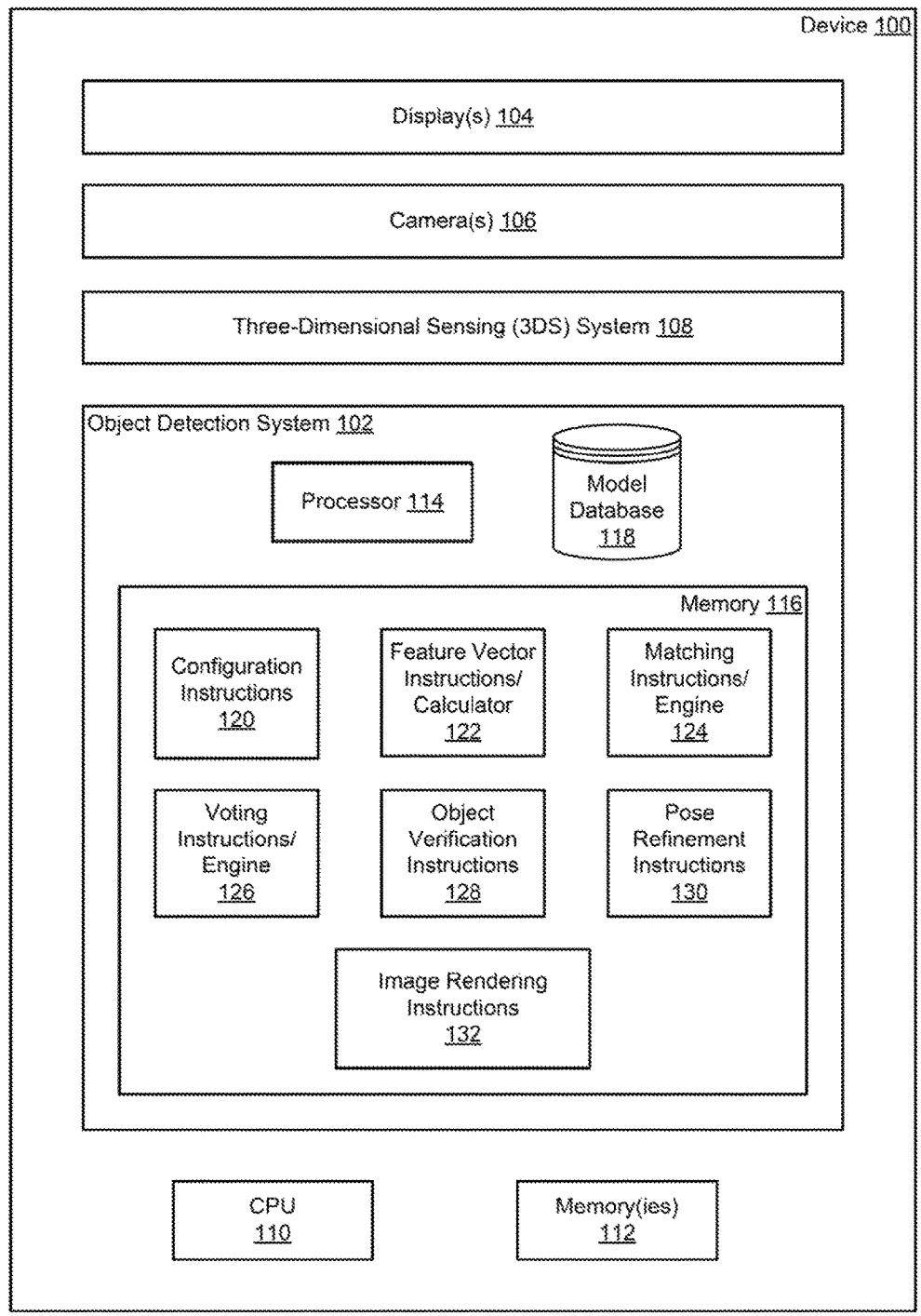
FIG. 1 is a block diagram of a system configured for object detection and pose estimation in accordance with one example.

The embodiments of the disclosed devices may assume various forms. Specific embodiments are illustrated in the drawing (and are hereafter described) with the understanding that the disclosure is intended to be illustrative, and is not intended to limit the invention to the specific embodiments described and illustrated herein.

DETAILED DESCRIPTION

Augmented reality systems are configured to capture an image of a real-world environment, or scene. Data indicative of the captured scene is often then modified in various ways in preparation for rendering of an image via a display. The modifications rely upon detecting objects present in the captured scene. The object detection includes or involves estimating the pose of the object within the scene.

Systems and methods for object detection and pose estimation are described. The detection and pose estimation may be provided in real-time (e.g., as input data is acquired). Performance in real time may be useful in connection with modifying image data as images are rendered and/or as further image data is acquired. For example, object detection and modifications to the rendered images (or other output data) may be provided as (or before) further scene input data is captured and/or as (or before) the field of view of an input data capture device of a viewer changes.

Objects are detected and oriented within a scene based on model data representative of the objects. The model data may be three-dimensional mesh data. The model data may include a set of three-dimensional object models acquired in an offline stage or other configuration procedure. Such configuration allows for the detection and pose estimation in real-time when image data of an environment is captured and processed to compute three-dimensional meshes of each visual scene of the environment.

A number of other aspects of the disclosed techniques support real-time object detection. For instance, data indicative of pairs of scene points and the associated surface normal vectors may be used as features for comparison with the model data. Such feature data is capable of fast computation. Thus, high computational complexity that would otherwise not allow for real-time object detection is avoided. Furthermore, objects are reliably detected without a large number of the scene point pairs. Other aspects that lead to real-time performance include storage of the model data in a database configured as a search tree, such as a k-dimensional tree (or k-d tree), where the fast retrieval of near-neighbor vectors is possible.

The systems and methods are also configured to provide robust detection and pose estimation for objects in a captured scene. A number of aspects of the disclosed techniques provide robust object detection and pose estimation. For instance, multiple aspects of the detection procedure—the features of the feature vector—the voting data structure, voting space, and voting procedure—and the use of a search tree for the object model data, such as a k-dimensional tree (or k-d tree).

The object detection is robust in multiple ways. For instance, real-time object detection is achieved in conjunction with the ability to detect objects not having complex geometry. Objects with complex geometry are easier to detect, as the complexity reduces ambiguity in object identity. Objects are also reliably detected in spite of noise or other incongruities in the input mesh data (e.g., the mesh geometry and normal vectors). For example, the augmented reality, input data capture, and/or other system that generates the input mesh data may not consistently assign the same direction to normal vectors of the mesh, in which case nearby or adjacent surface normal vectors alternate between pointing inward or outward from an object surface. The disclosed techniques are capable of nonetheless reliably detecting objects in spite of such surface normal inconsistencies.

The systems and methods are also capable of detecting one or more objects concurrently. The object detection is thus not limited to attempting to match a single object model at a time. The processing time is consequently not tied to (or dependent upon) the size of the object model database.

The object detection and pose estimation may be used in connection with various types of augmented reality processing. For example, the output data may be used to replace, remove, modify or enhance the appearance of a detected object, and/or augment the visualization of the scene around the location of the detected object given the estimated pose. The output data may also or alternatively be used to manipulate and/or interact in some way with a detected object. The detected location and pose of objects may also be used as milestones for geometric measurements. Exemplary applications of the disclosed methods and systems thus include (i) using real objects as augmented reality anchors to render augmented objects, tags, or other items or image data consistent with the geometry of the captured scene, (ii) editing reality by changing geometric (e.g., shape) and/or photometric (e.g., color, texture) properties of the real objects visible in the captured scene, including, for instance, making the objects disappear altogether, (iii) interacting in some way with the detected objects, including, for instance, gaming interactions, and (iv) measuring the geometric structure between detected (or otherwise known) objects, including, for instance, computing distances, angles, and other relative quantities.

The object detection and pose estimation techniques are useful with a variety of different displays and other electronic devices. The techniques are compatible with electronic devices with and without an onboard or otherwise integrated image data capture device (or camera). For instance, the image data may be captured by a separate camera and provided to the system for object detection and pose estimation. Alternatively or additionally, a separate display may be used to render images after the object detection processing. In other cases, the camera, object detection, display, or any combination thereof are integrated within a single device, such as a head-mounted device.

FIG. 1 shows an electronic device 100 having an object detection system 102 in accordance with one example. The object detection system 102 is configured to detect one or more objects in a scene and estimate a pose (e.g., position and orientation) for each object. In this example, the electronic device 100 includes one or more displays 104 on which images are rendered. The rendering of the images on each display 104 may include or otherwise incorporate data generated by the object detection system 102. For example, an image rendered on the display 104 may be labeled, augmented, or otherwise modified in accordance with the detected objects. In some cases, the display 104 is a monitor, television, or other wall-mountable display. In other cases, the display 104 is a handheld or wearable display. The type, size, construction, configuration, and other characteristics of the display 104 may vary.

The electronic device 100 includes a camera 106. The camera 106 may include one or more constituent cameras 106. Each constituent camera of the camera 106 may capture data representative of an environment, or scene. In this example, the camera 106 is integrated with the other components of the electronic device 100. As a result, the captured scene is consequently within the proximity of the electronic device 100. In other cases, the captured scene is part of an environment remote from the electronic device 100. In these and other cases, the electronic device 100 may include one or more communication modules or components directed to supporting network or other communications to receive data from the camera 106.

The camera 106 may include any number and type of image capture devices. In some cases, one or more cameras configured for visible light imaging are combined with one or more depth cameras. The depth cameras may be configured to measure depth through time-of-flight and/or other range-finding techniques, such as stereo triangulation. Alternatively or additionally, the camera 106 may include one or more cameras configured to capture infrared light or other wavelengths. Alternatively, the camera 106 may be configured to capture image data across multiple wavelengths.

In the example of FIG. 1, the electronic device 100 includes a three-dimensional sensing (3DS) system 108 to process the image data captured by the camera 106. For example, the processing provided by the 3DS system 108 may generate a three-dimensional point cloud and/or mesh representative of the captured image data. The 3DS system 108 may be configured to generate the depth information for the three-dimensional point cloud in cases in which the depth information is not provided by the camera 106. The mesh includes a number of data points and respective surface normal data for each data point. The 3DS system 108 may be provided via any combination of hardware, firmware, and software. For example, the 3DS system 108 may be implemented as a system-on-a-chip (SoC) having one or more embedded processors and one or more embedded memories in which instructions are stored to configure the processor to implement the image data processing tasks. Although shown as a discrete component of the electronic device 100, the 3DS system 108 may be integrated with the object detection system 102 and/or other device components to any desired extent. In some cases, the 3DS system 108 includes, or is provided by, an augmented reality (AR) system.

The device 100 also includes a processor 110 and a memory 112 coupled to the processor 110. In this example, the processor 110 and the memory 112 provide processing resources for implementing functions outside of the object detection system 102. For instance, the processor 110 and the memory 112 may be configured to support an operating environment provided by the electronic device 100. The processor 110 may be a general-purpose processor, such as a central processing unit (CPU), a graphic processing unit (GPU), or any other processor or processing unit. Any number of such processors or processing units may be included in the processor 110. In one example, the processor 110 is a multiple-core CPU. The memory 112 may be any type of memory, and may be integrated with the processor 110 to any desired extent. In one example, the memory 112 is or includes random-access memory or other volatile memory to support the execution of instructions by the processor 110. Further details regarding examples of the processor 110, the memory 112, and/or other processors and memories of the electronic device 100 are provided in connection with FIG. 4.

In the example of FIG. 1, the object detection system 102 includes a processor 114, a memory 116 coupled to the processor 114, and a model database 118 coupled to the processor 114. In some cases, the processor 114 is configured as, or includes, a GPU. The memory 116 may be dedicated to supporting object detection and pose estimation. To that end, stored in the memory 116 are a number of instruction sets for execution by the processor 114. Stored in the model database 118 is feature vector data for a number of models. The model database 118 may be or include a non-volatile storage device or unit. The memory 116 may include any number of memories. For example, the memory 116 may include a non-volatile memory, such as flash memory, on which one or more of the instruction sets is stored. The model database 118 and the memory 116 may be integrated to any desired extent. The processor 114 and the memory 116 may be integrated with one another to any desired extent.

Execution of the instruction sets configures the processor 114 (and/or another processor, such as the processor 110) to implement an object detection and pose estimation procedure. The procedure is configured to detect an object and estimate the pose of the object. The procedure takes a mesh for a scene as an input. The mesh may be generated by the 3DS system 108 from image data captured by the camera 106. The procedure randomly selects and processes a set of point pairs from the mesh for use as pairs to query the model database 118. Each point pair in the set may thus be referred to as a query point pair or scene point pair. After the processing of the scene point pairs, the procedure then votes, over all of the models in the model database 118, for a particular object and pose by attempting to match each scene point pair to point pairs in the model database 118. The instruction sets associated with these aspects of the procedure may be iteratively executed as new or modified scene input data is acquired or processed.

Using point pairs as the candidates instead of singular points makes the procedure more robust to mesh point and surface normal vector noise. Such noise may be present when the camera 106 includes a consumer-level depth camera.

In the example of FIG. 1, the instructions are disposed in an arrangement that includes configuration instructions 120, feature vector instructions 122, matching instructions 124, voting instructions 126, object verification instructions 128, pose refinement instructions 130, and image rendering instructions 132. The instruction set arrangement may vary. Additional, fewer or alternative instruction sets may be provided. For example, the image rendering instructions 132 may be stored as part of the augmented reality system 108 or other component of the electronic device 100. Any one or more of instruction sets may be integrated to a greater or lesser extent. For example, the object verification instructions 128 and the pose refinement instructions 130 may be combined into a single instruction set.

The configuration instructions 120 are directed to configuring the object detection system 102. For example, the configuration instructions 120 may be directed to generating model data for use during operation of the object detection system 102. The configuration instructions 120 may thus direct the processor 114 to store the model data in the model database 118. The configuration instructions 120 may be executed by the processor 114 during an offline phase.

The model data may be or include feature vector data for a number of object models. The feature vector data of each object model is indicative of a respective object to be detected by the object detection system 102. Model data may be stored for any number of objects. The configuration instructions 120 may direct the processor 114 to compute the feature vector data for a given object based on a mesh provided for the object. In one example, the configuration instructions 120 cause the processor 114 to execute instructions in the feature vector instructions 122 (e.g., one or more routines thereof) to compute the feature vector data for each mesh. Further details regarding the computation, components, and other characteristics of the feature vector data are provided in connection with the examples described in connection with the feature vector instructions 122. In other cases, the generation and/or storage of the model data is implemented separately from the configuration instructions 120.

Execution of the configuration instructions 120 by the processor 114 may configure the model database 118 and/or one or more of the other instruction sets of the object detection system 102. For example, the manner in which the model data is stored in the model database 118 may be established via execution of the configuration instructions 120. In some examples, the model data is arranged in a search tree data structure. The search tree data structure may be a k-dimensional tree (k-d tree). Other types of search tree and other data structures may be used. Use of a search tree data structure allows the procedure to evaluate all models at a fixed time complexity.

In search tree examples, the configuration instructions 120 may be used to establish one or more parameters of the object detection procedure. For instance, execution of the configuration instructions 120 may cause the processor 114 to adjust a distance in the k-d tree within which the feature vector data lies in order to be considered a potential match or, as described below, a nearest neighbor (or candidate). In such cases, the feature vector data may be stored in the k-d tree using the Mahalanobis or other unit-generic distance. The distance may then indicate the distance from a respective feature vector of a scene point pair of an input scene being matched.

Alternatively or additionally, the processor 114 is configured via execution of the configuration instructions 120 to establish the number of nearest neighbors (or candidates) in the model database 118 to be found for each feature vector being matched. The number of nearest neighbors may thus be predetermined before implementation of the object detection procedure. In one example, the number of nearest neighbors to be found for each feature vector is 80. The configuration instructions 120 may allow the number to be adjusted in either direction in accordance with, for instance, a tradeoff between accuracy (or reliability) and processing speed (or running time). The number may be increased to improve accuracy of the object detection and pose estimation, at the possible expense of a decrease in processing speed. The number may be decreased to improve the processing speed of the procedure, at the possible expense of a decrease in accuracy. An optimal number may be automatically or manually selected given a variety of parameters or operating conditions, including, for instance, the rate at which further input mesh data is provided by, e.g., the 3DS system 108.

Additional, fewer, or alternative parameters of the object detection system 102 may be established via the configuration instructions 120. For instance, the configuration instructions 120 may be used to select the number of scene point pairs to be processed. The model data to be considered for matching may also be selected. Some or all of the configuration instructions 120 may also or alternatively be executed during an online phase (e.g., during the processing of the input mesh data). For example, one or more adjustments to the matching procedure, such as the number of nearest neighbors, may be implemented during an online phase.

Execution of the feature vector instructions 122 causes the processor 114 to determine a respective feature vector for each scene point pair. The feature vector instructions 122 may thus establish a feature vector calculator of the object detection system 102. The feature vector instructions 122 may also include one or more input data gathering instruction sets. In the example of FIG. 1, the feature vector instructions 122 also cause the processor 114 to obtain a mesh for a scene input and to select a set of point pairs of the mesh. The mesh may be received or otherwise obtained from the 3DS system 108 and/or via a memory in communication with the 3DS system 108, such as the memory 112. In other cases, some or all of the mesh and other input data are obtained via a separate instruction set. For example, the surface normal data for point cloud data provided by the 3DS system 108 may be computed via input data processing instructions, which may or may not be implemented in connection with the feature vector instructions 122.

The feature vector instructions 122 are configured to calculate each feature vector based on the pair of points ($p1$, $p2$), which define a segment ($s$) therebetween, and further based on the corresponding surface normal vectors ($n1$, $n2$) at the points $p1$ and $p2$, respectively. Each feature vector describes the local geometry of the pair of points on the surface of the object. The local geometry may be described in a translationally and rotationally invariant manner. Thus, each pair of points on an object's surface yields the same feature vector, regardless of the three-dimensional position and three-dimensional orientation of the object in the scene. In some cases, the feature vector is fully rotationally invariant, such that the feature vector yielded by a particular pair of points is the same regardless of the 3-D orientation that the object has in space. In other cases, the feature vector is rotationally invariant along only a single, specific 3-D axis, e.g., the gravitational axis, such that the feature vector yielded by a particular pair of points remains the same as long as the object only undergoes rotations around the single, specific axis. In one example, the feature vector includes elements that specify or otherwise indicate the following:
  (i) the norm of the segment s;
  (ii) the angle between the segment s and the gravitational axis (g);
  (iii) an angle specifying the azimuth of the surface normal vector at the first point of the point pair with respect to a coordinate system uniquely determined by the point pair;
  (iv) an angle specifying the elevation of the surface normal vector at the first point of the point pair with respect to a coordinate system uniquely determined by the point pair;
  (v) an angle specifying the azimuth of the surface normal vector at the second point of the point pair with respect to a coordinate system uniquely determined by the point pair; and
  (vi) an angle specifying the elevation of the surface normal at the second point of the point pair with respect to a coordinate system uniquely determined by the point pair.

The azimuth and elevation angles may be specified in a three-dimensional system of coordinates uniquely determined by the segment s and the gravitational axis vector g, and the point being processed. For example, the origin of the system may be located at the point being processed. The magnitude of unity in the system may be set to be the length of segment s. The direction of the y-axis in the coordinate system may be set to be that of the gravitational axis. The direction of the x-axis in the system may be set to be that of the projection of segment s onto the plane orthogonal to the y-axis. The direction of the z-axis may be set to the cross product of the x- and y-axes.

One example of feature instructions 122 configured to calculate the foregoing elements is set forth below with comments denoted by the symbol "%".

% Compute the segment vector between the point pair:
    s=v2−v1;
    sUnit=s/|s|
  % Compute the angle between gravitational axis (y) and the segment 's':
    ySegmAngle=a cos(max(min(sUnit_y, 1), −1));
  % Compute the azimuth and elevation of first normal in first two quadrants with
  % origin at first vertex and angle 0 direction at the projection of 's' onto the (x,z)
  % plane:
    az1=mod(a tan 2(n1_z, n1_x)−a tan 2(sUnit_z, sUnit_x)+2 PI, 2 PI);
    el1=a cos(n1_y);
    if(az1>PI)
    {
      az1=az1−PI;
      el1=PI−el1;
    }
  % Compute the azimuth and elevation of second normal in first two quadrants with
  % origin at second vertex and angle 0 direction at the projection of '−s' onto the
  % (x,z) plane:
    az2=mod(a tan 2(n2_z, n2_x)−a tan 2(−sUnit_z, −sUnit_x)+2 PI, 2 PI);
    el2=a cos(n2_y);
    if(az2>PI)
    {
      az2=az2−PI;
      el2=PI−el2;
    }
  % Form the feature vector:
    f=[|s|, ySegmAngle, az1, el1, az2, el2]

The exemplary feature vector may be provided in a manner invariant to the sign of the direction of the surface normal vectors provided in the mesh input data. The 3DS system 108 (or other source of the mesh input data) may provide the sign of the surface normal vectors inconsistently. Nearby or adjacent joints on the same surface of an object may have surface normal vectors pointing in opposite directions, e.g., one pointing inward while the other points outward. Similarly, points in the object model may have surface normal vectors pointing in directions opposite to those in which the corresponding points in the scene input data are pointing. The feature vector elements are configured to address the possibility of such inconsistencies by computing the feature vector elements in way that is irrespective of the sign of the surface normal vectors. The elements of the feature vector may thus avoid introducing ambiguity in the pose of a point pair in space. By yielding an unambiguous 3-D pose, the feature vector reduces the likelihood of accuracy problems arising from objects having low-complexity geometries.

The computational complexity of the matching process may be lowered by reducing the number of candidate model point pairs (i.e., the feature vector nearest neighbors) from the object models in the model database for each query scene point pair being analyzed. This reduction may be achieved by limiting the possible rotation of the objects in the scene input to rotations about a single axis, e.g., the gravitational axis. Considering only rotations about the gravitational axis may be useful and appropriate in some applications, including, for instance, the detection of large objects (e.g., pieces of furniture) distributed around a room or other setting. However, in other cases, the object detection system 102 may be configured to allow one or more alternative or additional rotations about other axes. Data indicative of the gravitational axis (and/or other axes) may be provided by the 3DS system 108.

Additional, fewer, or alternative elements may be included in the feature vector. For example, a four-dimensional feature vector invariant to any three-dimensional rotation of the object may be used instead of the above-described six-dimensional feature vector, the four-dimensional feature vector specifying (i) the norm of the segment s; (ii) the angle between the segments and the surface normal n1; (iii) the angle between the segments and the surface normal n2; and (iv) the angle between the surface normal vectors n1 and n2. A variety of other feature vectors may be used to match scene point pairs to model object point pairs. One example of feature vector instructions configured to calculate the feature vector elements that are invariant to any three-dimensional rotation of the object model and whose elements are also configured to address the possibilities of inconsistencies in the sign of the surface normal vector is set forth with comments denoted by the symbol "%".

% Compute the segment vector between the point pair:
    s=v2−v1;
    sUnit=s/|s|;
  % Compute the angle between segment and normal at first point:
    cos SegmentNormalAngle1=dot(n1, sUnit);
    segmentNormalAngle1=a cos(min(abs(cos SegmentNormalAngle1), 1));

% Compute the angle between segment and normal at second point:
  cos SegmentNormalAngle2=dot(−n2, sUnit);
  segmentNormalAngle2=a cos(min(abs(cos SegmentNormalAngle2), 1));
% Compute the angle between normals:
  cos NormalNormalAngle=dot(n1, n2);
  normalNormalAngle=a cos(min(abs(cosNormalNormalAngle), 1));
% Form the feature vector:
  f=[|s|, segmentNormalAngle1, segmentNormalAngle2, normalNormalAngle]

The processor 114 may be further configured via the execution of the feature vector instructions 122 to compute a canonical aligning transformation for each point pair of the set of scene point pairs. The canonical aligning transformation is based on oriented point pair data for each scene point pair. The point pair data is oriented in the sense that the data includes data indicative of the surface normal vectors at each point of the point pair. The oriented point pair data is thus representative of both the coordinates (e.g., three-dimensional coordinates) of the points of the scene point pair as well as their surface normal vectors (e.g., three-dimensional surface normal vectors). In one example, the canonical aligning transformation is a computation that rigidly translates and rotates the point pair, and their surface normal vectors, to a Cartesian coordinate system such that the first point p1 is positioned at the origin, the second point p2 is positioned on the x-axis, and the surface normal vector n1 (for the first point p1) is on the plane spanned by the x- and y-axes. In that case, the data involved in computing the canonical aligning transformation includes the following elements: a rotation matrix (or other element used to align the direction of the segment s with the x-axis), a vector (or other element used to translate the first point pair to the origin), the length of the segment between the points in the pair, a vector specifying the position on the <x,y> plane of the end of the unit normal vector at the first point after the translation and rotation matrix was initially applied, an angle of rotation around the x-axis by which the end of the unit normal vector at the second point is made to lie on the <x,y> plane, after the translation and rotation matrix was initially applied, and a vector specifying the position of the end of the unit normal vector at the second point after the translation and rotation matrix was initially applied. Each of these elements may be computed for each scene point pair in preparation for comparison with the feature vector data in the model database 118. As described below, each of these elements may also be computed for each of nearest neighbor (or candidate) point pairs to support the voting process.

One example of the instructions used to compute the elements of the canonical aligning transformation is set forth below, where the rotation matrix is R, the vector is RT, the segment length is segmLength, the second vector is normal1OnXYPlane, the angle is alpha2, and the third vector is rotN2, and where the function rotationU(alpha) represents a rotation by alpha radians around the U-axis, where the U-axis is one of the X-, Y-, and Z-axes.

% Compute the unit segment vector for the current point pair:
  s=v2−v1
  segmLength=|s|
  sUnit=s/|s|
% Compute the 3-D rotation 'R1' which, after translation by '−v1',
% aligns the segment between the point pair with the x-axis:
  R1=rotationY(PI/2−a cos(sUnit_z))*rotationZ(−a tan 2(sUnit_y, sUnit_x));
% Compute the angle 'alpha1' of rotation around the x-axis which, after rotation
% by 'R1', positions the normal at the first point to fall within the <x,y> plane:
  rotN1=R1*n1
  alpha1=−a tan 2(rotN1_z, rotN1_y);
% Compute the coordinates of the first normal after transforming it to fall within
% the <x,y> plane.
% (The y-component must be such that the vector norm's are one, and the
% z-component must be zero):
  normal1OnXYPlane=[rotN1_x;
    sqrt(1−rotN1_x*rotN1_x);
    0]
% Compute the coordinates of the second normals after rotations by 'R1', and
% rotation by 'alpha1s' around the x-axis (to position the first normal within the
% <x,y> plane) and rotation by 'alpha1s+PI':
  rotN20=R1*n2
  rotN2=[rotN20_x;
    cos(alpha1)*rotN20_y−sin(alpha1)*rotN20_z;
    sin(alpha1)*rotN20_y+cos(alpha1)*rotN20_z]
% Compute the angle 'alpha2' of rotation around the x-axis which, after rotation
% by 'R1', and rotation by 'alpha1' around the x-axis (to position the first
% normal within the <x,y> plane), positions the normal at the second point to fall
% within the <x,y> plane:
  alpha2=−a tan 2(rotN2_z, rotN2_y);
% Compute the full canonical alignment rotation:
  R=rotationX(alpha1)*R1
% Compute the rotation by 'R' of the translation that moves the first point of the
% pair to the origin:
  RT=−R*v1
% Assemble the canonical transformation data:
  canonicalTransformData=[R, RT, segmLength, normal1OnXYPlane, alpha2, rotN2]

The canonical aligning transformation may differ from the example described above. For instance, the scene point pair may be rigidly translated and rotated to a different position and/or orientation in the Cartesian coordinate system. The elements computed for the canonical aligning transformation may also differ. For example, the first point in the pair may be moved to any arbitrary (but fixed) location instead of the origin. Also, instead of aligning the segment with the x-axis, the segment may be aligned with any arbitrary (but fixed) direction in the coordinate system. Moreover, instead of aligning the segment, the direction of the normal vector at the point may be the aligned item. The canonical aligning transformation for each point pair may be computed at various times during the procedure. For example, the canonical aligning transformation for each point pair may be computed before or after the nearest neighbor determination. The canonical aligning transformation for each point pair may thus, in some cases, be computed during execution of the matching instructions 124. In other examples, the object detection system 102 is configured to process the scene input data without computing the canonical aligning transformation data for the scene and candidate point pairs. As a result, a rigid three-dimensional transformation (described below) between each scene point pair and its candidate point pairs may be computed (e.g., directly) without transformation of the oriented point pair data of both point pairs to a canonical position as described above.

The matching instructions 124 are directed to computing a matching between the captured scene input data and one or more of the models of the model database 118. The matching may be implemented by a matching engine of the object detection system 102. The matching is based on the feature vector for each scene point pair and the feature vector data for the models in the model database 118. Execution of the matching instructions 124 causes the processor 114 to find, for the feature vector of each scene point pair, a respective plurality of nearest neighbor point pairs in the model data stored in the model database 118. As described above, the feature vector data may be representative of a number of models, the feature vector data of each model being indicative of a corresponding object of a number of objects. Each of the nearest neighbor point pairs provides a candidate in the voting process to detect an object and estimate the pose thereof. The nearest neighbor point pairs are thus the candidate matching model point pairs for the respective scene point pair, and may thus be referred to as the candidate model point pairs.

In the example of FIG. 1, the matching procedure may begin with accessing the model database 118. The feature vector data for the object models may be retrieved or otherwise obtained. To find the plurality of candidate (nearest neighbor) model point pairs (via their associated feature vector data) for each scene point pair, the matching instructions 124 implement a nearest-neighbor search procedure that allows the fast retrieval of a number of feature vectors that are closest in distance to the feature vector of the scene point pair. The search procedure may be configured such that a small number of target feature vectors are compared with the query feature vector until a predetermined number of nearest neighbors of the query feature vector are retrieved. Alternatively, the data structure may retrieve the list of all feature vectors that lie within a given distance from the query feature vector. To find the plurality of candidate model point pairs for each scene point pair, the matching instructions 124 may query the model database 118 (e.g., k-d tree) to determine the nearest neighbors within a threshold distance. The database query may accordingly cause a respective distance between the respective feature vector of the scene point pair and some of feature vectors contained in the model database 118 in order to determine those that are closest to that of the scene point pair. The threshold distance may be predetermined. Alternatively or additionally, the number of nearest neighbors for each scene point pair may be predetermined (e.g., 80), as described above. The point pairs in the model database 118 determined to be closest to the scene point pair are identified for further processing in accordance with the matching instructions 124.

The matching instructions 124 are also directed to determining a transformation between each scene point pair and its candidate model point pairs having nearest neighbor feature vector data. For each candidate model point pair, a respective aligning transformation from the scene point pair to the candidate model point pair is computed. In some cases, the aligning transformation computation is based on canonical aligning transformation data for the scene point pairs and the candidate model point pairs. Thus, to support the aligning transformation computation, canonical aligning transformation data is computed for the oriented point pair data of each candidate model point pair. The canonical aligning transformation data may be computed using the same instructions relied upon to compute the canonical aligning transformation data for the oriented point pair data of the scene point pair. The canonical aligning transformation may thus be computed based on the oriented point pair data for each candidate model point pair as described above. As described above, the canonical aligning transformation data for the scene point pairs may be computed in connection with the computation of the feature vector.

The canonical aligning transformation data for the model point pairs may be pre-computed. For example, the model data in the model database 108 may be pre-processed in, for instance, an offline mode (e.g., before any image data is captured by the camera 106), to determine the canonical aligning transformation data for each possible point pair of an object model. In some cases, the canonical aligning transformation data for the model data is computed via execution of the configuration instructions 120. As a result, only the canonical aligning transformation data for the scene point pairs is computed during an online mode (e.g., in real-time) by either the feature vector instructions 122 or the matching instructions 124. That computation may occur before iterative processing of each candidate model point pair to determine the transformation between each scene point pair and its candidate model point pairs.

After the canonical aligning transformation elements have been computed for each scene point pair, a three-dimensional, rigid transformation of the scene point pair and each of its nearest neighbor point pairs may be computed. Each computed three-dimensional transformation T between the scene point pair Q and a candidate point pair S (from some object model M in the database) is the rigid transformation that model M undergoes in order for the model point pair S to appear in the scene at the location and orientation where scene point pair Q appears. That is, the transformation T indicates the pose of the model object M in the scene if effectively the scene point pair Q is a correct match of model point pair S. In the example of FIG. 1, the aligning transformation is based on the elements of the two canonical aligning transformation datasets. The translation and rotation between the feature vectors of the scene point pair and each candidate point pair are computed by finding the rigid transformation that geometrically aligns both feature vectors. The rotation may be provided as a three-dimensional rotation matrix R. The translation may be provided as a three-dimensional translation vector T. One or both of the rotation and translation may be converted into quantities that are more convenient for comparison. For example, an angle-axis vector r may be computed as a representation of the rotation matrix R. The rigid aligning transformation may include or involve alternative or additional techniques for computing the rotation and the translation involved in transforming the scene point pair (or the feature vector thereof) to the respective nearest neighbor point pair (or the feature vector data thereof), or vice versa. For example, instead of independently computing intermediate transformations Tq and Tn to bring the query and nearest neighbor point pairs into the same three-dimensional (canonical) position, respectively, and then compute the final transformation T between the two point pairs as a composition of these two intermediate transformations, i.e., $T=Tq^{-1} \times Tn$, a procedure that directly computes the transformation T between the two point pairs may be employed.

One example of the instructions used to compute the translation and rotation of the rigid aligning transformation data is set forth below, where the canonical aligning transformation elements for the scene point pair are represented by the variables {sR, sRT, sSegmLength, sNormal1OnXYPlane, sAlpha2, and sRotN2}, and where the canonical aligning transformation data elements for the candidate point pair from the model database 118 are represented by the variables {mR, mRT, mSegmLength, mNormal1OnXYPlane, mAlpha2, and mRotN2}, and where the function rotationX(alpha) represents a rotation by alpha radians around the x-axis.

```
% Calculate the squared distance 'd1' between the tip of
    the 1st model and
% scene unit normal vectors after rotating the scene
    feature vector around the
% x-axis by PI radians when the normal vectors in the
    model and scene features
% are in opposite directions:
    % Squared x-distance between the model and scene 1st
        normals both in their
    % current directions:
        d1x_minus=(mNormal1OnXYPlane_x−
            sNormal1OnXYPlane_x)^2
    % Squared x-distance between the model and scene 1st
        normals when rotating
    % the scene's normal around the x-axis by PI radians
        and switching its direction:
        d1x_plus=(mNormal1OnXYPlane_x+
            sNormal1OnXYPlane_x)^2
    % Squared y-distance between the model and scene 1st
        normals, which both fall
    % on the positive y-semi-plane:
        d1y=(mNormal1OnXYPlane_y−
            sNormal1OnXYPlane_y)^2
    % Squared distance between the tips of the model and
        scene 1st normals in
    % their current directions:
        d1_minus=d1x_minus+d1y;
    % Squared distance between the tips of the model and
        scene 1st normals when
    % its rotated by pi around the x-axis and its direction
        is switched:
        d1_plus=d1x_plus+d1y;
    % Closest squared distance between the tips of the
        model and scene 1st normals
    % when the scene normal is rotated if necessary:
        d1=min(d1_plus, d1_minus);
    % Indicator if required to rotate and negate the scene's
        first normal in order
    % to align it with its corresponding model normal:
        flipNormal1=(d1_plus<d1_minus);
% Calculate the squared distance 'd2' between the tips of
    the 2nd model and scene
% unit normal vectors after the required rotations of the
    scene feature vectors
% around the x-axis so that the 1st normal vectors in
    the model and
% scene features were in alignment:
    if(flipNormal1)
    {
        % Apply the rotation applied to the first normals to
            the second normals:
            mRotN2_y=−mRotN2_y;
            mRotN2_z=−mRotN2_z;
    }
    % Squared distance between the tips of the model and
        scene 2nd normals in
    % their current directions:
        d2_minus=|mRotN2−sRotN2|^2
    % Squared distance between the tips of the model and
        scene 2nd normals when
    % its direction is switched:
        d2_plus=|mRotN2+sRotN2|^2
    % Indicator if required to negate the scene's second
        normal in order to align
    % it with its corresponding model normal:
        flipNormal2=(d2_plus<d2_minus)
% Compute the rotation that takes the model to the
    canonical position, and
% pre-multiply it by the inverse of the transformation that
    takes the scene to the
% canonical position and then rotates the 2nd normal half
    way between its position
% when the 1st normal is on the <x,y> plane in the case
    of the model and the
% scene:
    sAlpha2Offset=PI*flipNormal1−PI*flipNormal2;
    beta=a tan 2((sin(mAlpha2)+sin(sAlpha2+
        sAlpha2Offset))/2, (cos(mAlpha2)+cos(sAlpha2+
        sAlpha2Offset))/2);
    halfAlpha2=sAlpha2+sAlpha2Offset−beta;
% Let 'sf' be the scene feature vector and let 'mf' be its
    corresponding model
% feature vector.
% Let 'Rs' be the scene rotation, let 'Ts' be the scene
    translation,
% let 'Rm' be the model rotation, and let 'Tm' be the
    model translation.
% Then, applying the transformations (Rs,Ts) and (Rm,
    Tm) to the scene feature 'sf'
% and corresponding model feature 'm',
% respectively, takes both features to their canonical
    positions, i.e.,
%
% Rs(sf+Ts)=Rm(mf+Tm)
%
% We want to modify this equation to include:
% a) a translation 'TXHalfSegmDiff' of the scene feature
    along the x-axis so
% that the center of both feature segments fall on the same
    point, i.e.,
% TXHalfSegmDiff=[1 0 0]'*(model feature segment
    length−
% scene feature segment length)/2),
% and
% b) a rotation 'RXHalfAlpha' of the scene feature
    around the x-axis so that the
% 2nd normal of the scene feature is half way between its
    position and that
% of the 2nd normal of the model feature.
%                   (Notice            that
    RXHalfAlpha*TXHalfSegmDiff=TXHalfSegmDiff)
%
% This leads to:
%
% RXHalfAlpha (Rs (sf+Ts))+TXHalfSegmDiff=Rm
    (mf+Tm)
%
% After some algebra to solve for the transformation
    (R,T) that needs to be
% applied to model feature 'mf' in order to obtain scene
    feature 'sf', we get:
%
% sf=Rs^t RXHalfAlpha^t Rm mf+
    Rs^t RXHalfAlpha^t (Rm Tm−TXHalfSegmDiff−RXHal-
    fAlpha Rs Ts)
%
```

% That is:
% R=Rs^t RXHalfAlpha^t Rm
% T=Rs^t RXHalfAlpha^t (Rm Tm−TXHalfSegmDiff−RXHalfAlpha Rs Ts)
%
% where
% RXHalfAlpha=rotationX(halfAlpha2)
% TXHalfSegmDiff=[(mSegmentLengths(h)−sSegmentLengths(k))/2; 0; 0];
% Rm=mR
% R0=flipNormal1(h)? RXpi: Identity
% RXpi=rotationX(P)
% Rs=R0*sR
% Tm=mT
% Ts=sT
   RXHalfAlpha=rotationX(halfAlpha2)
   if(flipNormal1)
   {
     RR=(RXHalfAlpha*rotationX(PI)*sR)^t
     RT2=rotationX(PI)*sRT:
   }
   else
   {
     RR=(RXHalfAlpha, sR)^t
     RT2=sRT;
   }
   TXHalfSegmDiff=[(mSegmentLength−sSegmentLength)/2;
   0;
   0]
   R=RR*mR
   T=RR*(mRT−RXHalfAlpha*(RT2+TXHalfSegmDiff))

The rigid aligning transformation (or other aligning transformation between the query and candidate point pairs) defines a respective model-transformation combination for each nearest neighbor point pair. Each model-transformation combination specifies the respective aligning transformation and the respective model with which the nearest neighbor point pair is associated. In the example described above, the transformation is represented by a three-dimensional rigid transformation. A total of six dimensions are involved—three dimensions for the translation T along three axes, and three dimensions for the angle-axis vector r for the rotation about the three axes. The model-transformation combination may thus be a seven-dimensional point.

Execution of the voting instructions 126 causes the processor 114 to implement a voting scheme in which both a model identity and a six-dimensional pose (three dimensions for position and three dimensions for rotation) are identified. The voting scheme may be implemented by a voting engine configured in accordance with the voting instructions 126. In the example of FIG. 1, the voting instructions 126 direct the processor 114 to increment, with each binning of a respective one of the model-transformation combinations, a respective bin counter for the model-transformation combination. In one example, a hashing with seven dimensions may be initialized to accumulate the votes for the model-transformation combinations.

The accumulation of votes includes a binning procedure. Each bin covers a respective range of the model-transformation combinations. In that way, the exact same values for each floating-point element of the transformation need not be achieved to increment one of the bin counters. Binning allows the transformation element values to be approximately equal or similar, but not identical. In one example, a heap-sort procedure is implemented to compute a set of bins from the hashing. The output of the heap-sort procedure also determines the bins with the highest number of votes, or counts. Other types of procedures may be used to bin or group the model-transformation combinations for counting. For instance, fixed ranges may be predetermined for the transformation data.

The voting instructions 126 also direct the processor 114 to select a number of the model-transformation combinations having sufficiently high counts. The number may zero, one or more. In one example, a Random Sampling and Consensus (RANSAC) procedure is implemented to find the set of model-transformation combinations with sufficient consensus from among all model-transformation combinations in the top-voted bins. A number of objects are then deemed to have been detected depending upon the number of model-transformation combinations deemed to have sufficient consensus. The number of objects detected may thus range from zero upward. Other techniques may be used for the selection in accordance with the counters to detect the number of objects in the scene input and estimate a pose of each detected object. For example, the average transformation at each top-voted bin may be selected.

In the example of FIG. 1, the object detection system 102 executes the object verification instructions 128 to verify model matches. The verification may be based on model and scene geometry. For instance, execution of the verification instructions 128 may cause the processor 114 to confirm that some or all of the surfaces of the object as defined via the input mesh data match those of the object model. Any number of additional points on the surfaces of the object may be tested against the object model for the confirmation. In one example, the model database 118 is accessed to obtain further points for comparison with the input mesh data. If a sufficient number (e.g., percentage) of model points have corresponding points in the input mesh data, the object model identification and pose estimation are verified. Alternatively or additionally, the verification instructions 128 may be configured to compare the direction of the surface normal vectors of the object model and the input mesh data.

Execution of the pose refinement instructions 130 causes the processor 114 to implement a procedure that refines the pose of the detected objects. The pose refinement may be directed to improving the overlay of the detected object relative to the surrounding environment. For instance, surface alignment may be improved. In some cases, an iterative closest point (ICP) procedure is implemented. Other point-cloud registration procedures may be used, including, for example, the method of Pottmann, Leopoldseder, and Hofer and/or other ICP alternative methods.

The identification of objects by the object detection system 102 may be used to modify images rendered on the display 104 of the electronic device 102. The image rendering instructions 132 may be executed to cause the processor 114 to provide output data directed to modifying the images to be rendered. For example, the output data may be used to replace, remove, modify or enhance the appearance of the detected object(s). The output data may alternatively or additionally modify the visualization of the scene around the location of the detected object given the estimated pose.

Additional or alternative types of output data may be generated by the object detection system 102. For instance, output data indicative of the detected object and estimated pose may be provided to the processor 110 or other component of the electronic device 100. The processor 110 may use the output data for purposes involving or not involving image rendering.

Figure 2:
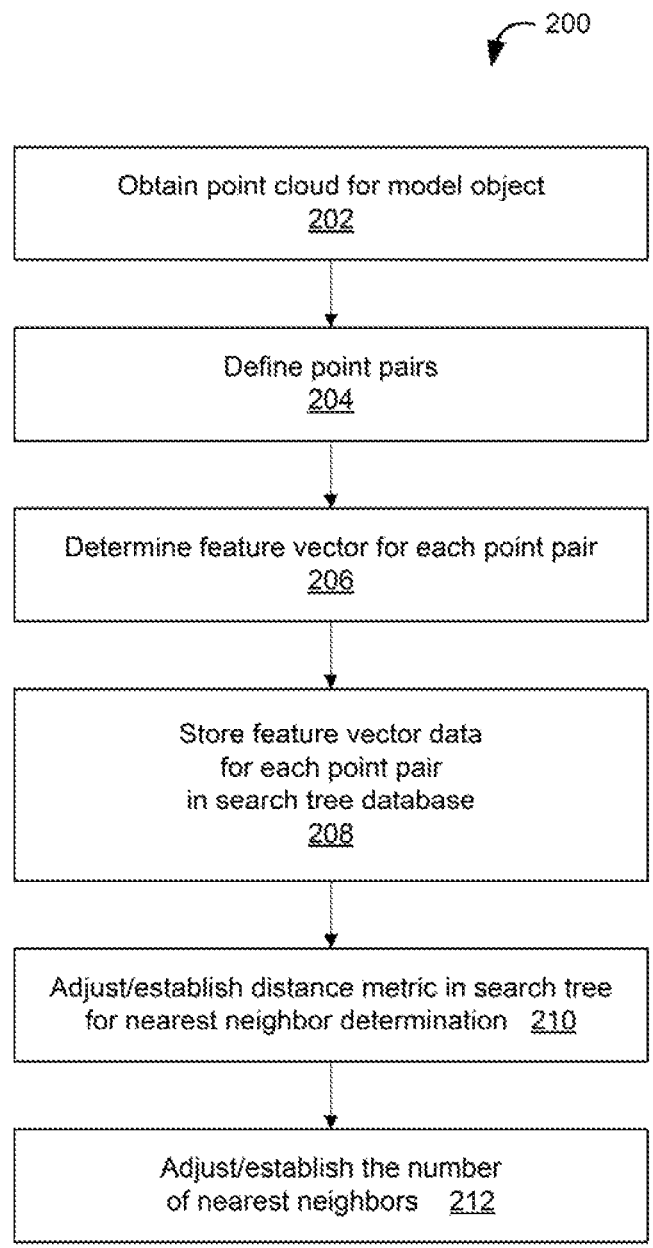
FIG. 2 is a flow diagram of a computer-implemented method for configuration of an object detection system in accordance with one example.

FIG. 2 depicts an exemplary method 200 for configuring an object detection system. The method is computer-implemented. For example, one or more processors of the electronic device 100 shown in FIG. 1 and/or another electronic device may be configured to implement the method or a portion thereof. The implementation of each act may be directed by respective computer-readable instructions executed by a processor of the object detection system 102 (FIG. 1), the device 100, and/or another processor or processing system. Additional, fewer, or alternative acts may be included in the method. For example, the method 200 may not include acts directed to adjusting a configuration of the object detection system.

In some cases, the method 200 is implemented during an offline phase of operation. For example, the offline phase may be implemented during a time period in which the object detection system is not being tasked with object detection. Alternatively, one or more of the acts of the method 200 may be implemented during an online phase of operation. For example, the acts directed to adjusting the configuration of the object detection system may be implemented concurrently with one or more acts of the object detection method.

The method 200 may begin with one or more acts related to capturing image data for objects to be modeled. The image data may be captured in a distributed manner, e.g., including devices or systems remote from the device or system implementing the method 200. The image data may also be pre-processed by, for instance, a 3DS system, to determine surface normal vectors. Eventually, point cloud and/or mesh data is obtained for one or more objects in an act 202.

In act 204, a number of point pairs are defined. Each model may include any number of point pairs. The point pairs may or may not exhaustively cover each surface of each object represented in the mesh data.

Feature vector data is determined in act 206 for each point pair. The feature vector may include a number of elements as described above. In act 208, the resulting feature vector data computed for each point pair is stored in a search tree database, such as a k-d tree, or other model database.

The model database and/or other aspects of the object detection procedure may be customized or otherwise configured. In the example of FIG. 2, the method 200 includes an act 210 in which a distance value within which nearest neighbor points from a query point are searched is adjusted or otherwise established in the search tree database. The metric used to measure distances may be a Mahalanobis or other unit-generic metric. Alternatively or additionally, the number of nearest neighbor point pairs to be found may be adjusted or otherwise established in act 212. Additional, fewer, or alternative aspects of the object detection procedure may be adjusted. For instance, the number of scene point pairs to be used during a given iteration of the procedure may be adjusted.

The order of the acts of the method may vary from the example shown. For example, in some cases, the acts 210 and/or 212 may be implemented before the acts related to computing and storing the feature vector data for the object models. Some of the acts may alternatively be implemented in parallel or concurrently. For example, the acts the acts 210 and/or 212 may be implemented concurrently with the acts related to computing and storing the feature vector data for the object models.

Figure 3:
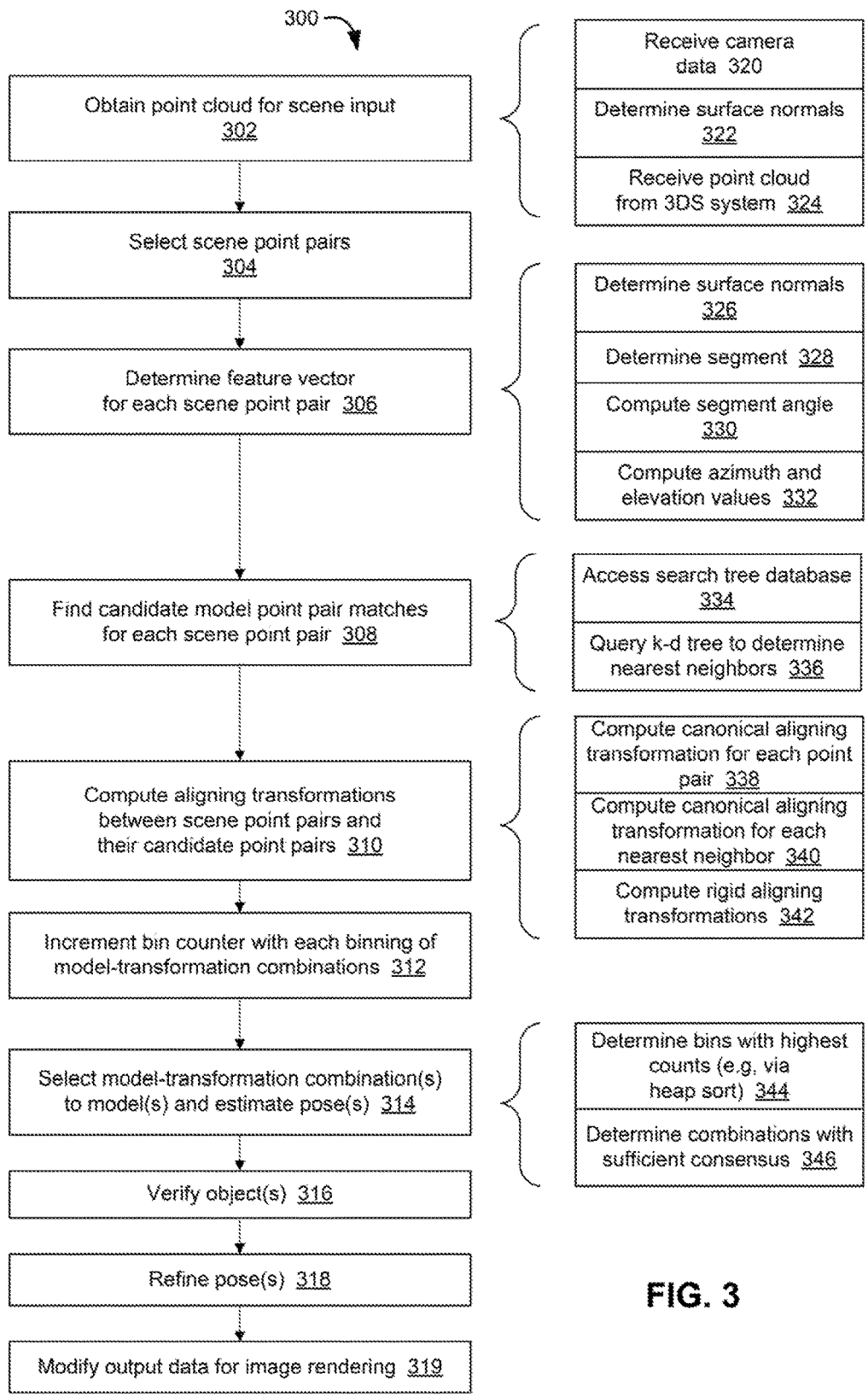
FIG. 3 is a computer-implemented method for object detection and pose estimation in accordance with one example.

FIG. 3 depicts an exemplary method 300 for object detection and pose estimation. The method is computer-implemented. For example, one or more processors of the electronic device 100 shown in FIG. 1 and/or another electronic device may be configured to implement the method or a portion thereof. The implementation of each act may be directed by respective computer-readable instructions executed by a processor of the object detection system 102 (FIG. 1), the device 100, and/or another processor or processing system. Additional, fewer, or alternative acts may be included in the method. For example, the method 300 may not include acts directed to modifying data for image rendering.

The method 300 may begin with an act 302 in which a point cloud or mesh data is obtained for an input scene. The input scene may correspond with a field of view of one or more cameras configured to capture image data indicative of the input scene. The image data may be processed by, for example, a 3DS system, to generate the point cloud or mesh data. A set of point pairs from the mesh data is selected in an act 304 for use in querying the model database, as described above. The scene point pairs may be located on a number of surfaces present in the mesh data. The surfaces may be unrelated to one another. For instance, the surfaces may be associated with different objects in the input scene. In such cases, multiple objects may be detected during the current iteration of the method 300. The number of scene point pairs selected may be customized in view of various operational parameters, including, for instance, runtime performance for object detection in real time.

In act 306, a feature vector is determined for each scene point pair. The feature vector may include a number of elements based upon the positions of the point pair and their respective surface normal vectors, as described above. The elements may be configured to be invariant to whether the surface normal is projecting inward or outward from the surface, as also described above.

A number of nearest neighbor point pairs are then found in act 308 for each scene point pair. The nearest neighbors are found by comparing the feature vector of the scene point pair with the feature vector data in a model database. The model database may include feature vector data for multiple object models. Each nearest neighbor point pair becomes a candidate point pair in a voting scheme to determine both the object identity and the pose of the detected object.

In act 310, an aligning transformation is computed for each nearest neighbor point pair. The aligning transformation is indicative of the translation and rotation involved in the transition between each scene point pair and its nearest neighbor point pairs, as described above. The aligning transformation may thus be based on the oriented point pair data of the scene point pair and the respective oriented point pair data of each nearest neighbor point pair. As described above, computation of the aligning transformation may include intermediate canonical aligning transformations of the scene and model point pairs to support the aligning transformation between the query and candidate point pairs.

The combination of the computed aligning transformation and the identity of the model object with which the candidate point pair is associated is then tracked. For instance, in act 312, a bin counter is incremented for each binning of one of the model-transformation combinations. Using the counters, the model-transformation combinations with sufficiently high counts may then be selected in act 314 as indicative of the object(s) present in the scene input and the estimated pose(s) of the detected object(s). After the selection, object verification and pose refinement procedures may be implemented in acts 316, 318.

In the example of FIG. 3, output data for image rendering is modified or otherwise provided in act 319. The output data may be directed to modifying the images to be rendered on a display. The output data may be used to replace, remove, modify or enhance the appearance of the detected object(s). The output data may alternatively or additionally modify the visualization of the scene around the location of the detected object given the estimated pose.

FIG. 3 depicts a number of optional acts that may be implemented in some examples of the method 300. Any combination of the optional acts may be used. Obtaining the mesh and/or other input data in the act 302 may include receiving camera data in act 320, determining surface normal vectors in act 322, and/or receiving the surface normal vectors as part of the point cloud or mesh data from a 3DS system in act 324. The act 302 may also include the point cloud determination in cases, for instance, in which the method 300 is implemented by, or in conjunction with, an AR system or other 3DS system.

The feature vector determination in the act 306 may include determining surface normal vectors in act 326 (if not determined previously). In the example of FIG. 3, the feature vector includes the segment, angle, azimuth, and elevation quantities described above, the values of which are respectively computed in acts 328, 330, and 332 as shown.

Finding the nearest neighbor point pairs in the act 308 may include accessing a search tree database, such as k-d tree, in act 334. Other types of model databases may be used. In k-d and other search tree examples, the nearest neighbor point pairs may be found by querying in act 336 the k-d tree to determine the model point pairs having nearest neighbor feature vectors (e.g., within a predetermined distance) from the query point pair feature vector.

The computation of the aligning transformation between each scene point pair and its candidate nearest neighbor point pairs may be based on underlying canonical aligning transformations for the scene point pairs and the candidate point pairs in acts 338, 340. The underlying canonical aligning transformations may not be computed during the act 310. As noted above, these underlying canonical aligning transformations may be computed offline (e.g., for the model data) or in connection with the computation of the feature vector for each scene point pair. A rigid aligning transformation may then be computed in act 342 based on the outputs of the canonical aligning transformations, as described above. The output of the rigid aligning transformation may include a three-dimensional translation and a three-dimensional rotation representative of the offset between the query and candidate point pairs, as also described above.

The selection of model-transformation combinations in the act 314 may include determining bins with the highest counts in act 344. For example, a heap-sort procedure may be implemented to efficiently find the top-voted bins. Once the bins are determined, the model-transformation combinations with sufficient consensus may then be determined in act 346, as described above. A number of the model-transformation combinations is thus selected, the number ranging from zero upward depending upon the number of combinations having sufficient consensus.

The order of the acts of the method may vary from the example shown. For example, in some cases, the canonical aligning transformation for each scene point pair may be computed before the nearest neighbors are determined. Some of the acts may alternatively be implemented in parallel or concurrently. For example, the computation of the canonical aligning transformation for each scene point pair may be implemented concurrently as the feature vector is determined for the scene point pairs.

Figure 4:
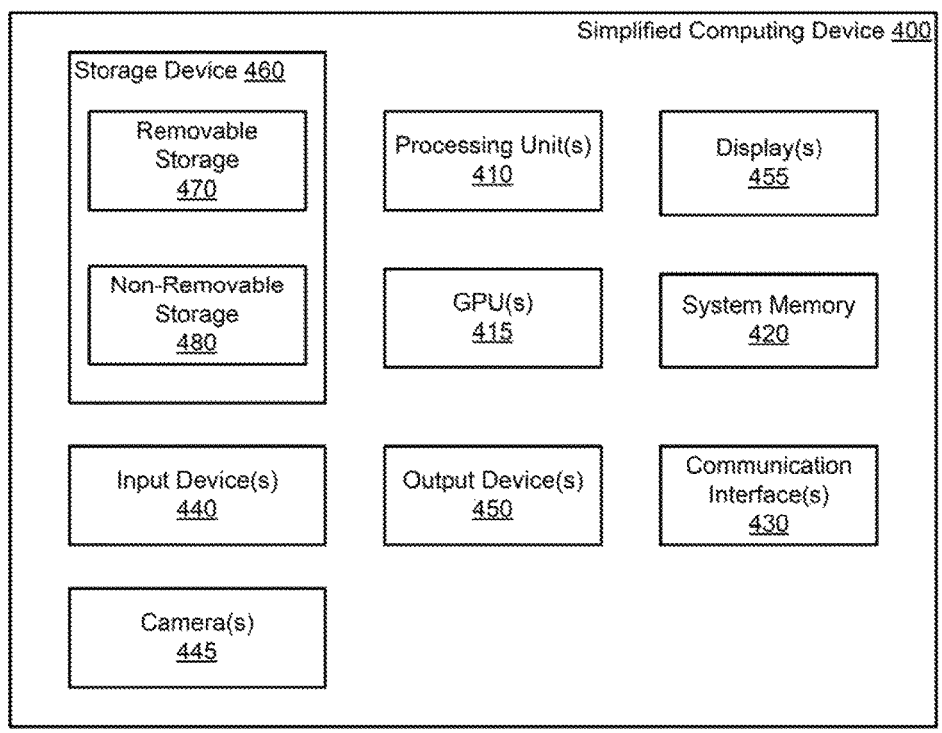
FIG. 4 is a block diagram of a computing environment in accordance with one example for implementation of the disclosed methods and systems or one or more components or aspects thereof.

With reference to FIG. 4, an exemplary computing environment or device 400 may be used to implement one or more aspects or elements of the above-described methods and/or systems. The computing device 400 may be used by, incorporated into, or correspond with, the electronic device 100 (FIG. 1) or one or more elements thereof. For example, the computing device 400 may be used to implement the object detection system 102 (FIG. 1) or a host device or system in communication with the object detection system 102. The computing device 400 may be a general-purpose computer system used to implement one or more of the acts described in connection with FIGS. 2 and/or 3. The computing device 400 may correspond with one of a wide variety of computing devices, including, but not limited to, personal computers (PCs), tablet and other handheld computing devices, wearable computers, laptop or mobile computers, communications devices such as mobile phones, and game consoles.

The computing device 400 has sufficient computational capability and system memory to enable basic computational operations. In this example, the computing environment 400 includes one or more processing unit(s) 410, which may be individually or collectively referred to herein as a processor. The computing device 400 may also include one or more graphics processing units (GPUs) 415. The processor 410 and/or the GPU 415 may include integrated memory and/or be in communication with system memory 420. The processor 410 and/or the GPU 415 may be a specialized microprocessor, such as a digital signal processor (DSP), a very long instruction word (VLIW) processor, or other microcontroller, or may be a general purpose central processing unit (CPU) having one or more processing cores. The processor 410, the GPU 415, the system memory 420, and/or any other components of the computing environment 400 may be packaged or otherwise integrated as a system on a chip (SoC), application-specific integrated circuit (ASIC), or other integrated circuit or system.

The computing device 400 may also include other components, such as, for example, a communications interface 430. One or more computer input devices 440 (e.g., pointing devices, keyboards, audio input devices, video input devices, haptic input devices, devices for receiving wired or wireless data transmissions, etc.) may be provided. The input devices 440 may include one or more touch-sensitive surfaces. In this example, the computing device 400 includes one or more cameras 445 (e.g., depth cameras) to capture image data indicative of a scene to be processed for object detection.

Various output devices 450, including touchscreen or touch-sensitive display(s) 455, may also be provided. The output devices 450 may include a variety of different audio output devices, video output devices, and/or devices for transmitting wired or wireless data transmissions.

The computing device 400 may also include a variety of computer readable media for storage of information such as computer-readable or computer-executable instructions, data structures, program modules, or other data. Computer readable media may be any available media accessible via storage devices 460 and includes both volatile and nonvolatile media, whether in removable storage 470 and/or non-removable storage 480.

Computer readable media may include computer storage media and communication media. Computer storage media may include both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing device 400.

The object detection techniques described herein may be implemented in computer-executable instructions, such as program modules, being executed by the computing device 400. Program modules include routines, programs, objects, components, data structures, etc., that perform particular tasks or implement particular abstract data types. The techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

In one aspect, a system includes a memory in which feature vector instructions, matching instructions, and voting instructions are stored, and a processor coupled to the memory. The processor is configured via execution of the feature vector instructions to obtain a mesh for a scene input, to select a set of scene point pairs of the mesh, and to determine a respective feature vector for each scene point pair of the set of scene point pairs. The processor is configured via execution of the matching instructions to find, for each feature vector, a respective plurality of nearest neighbor point pairs in feature vector data of a number of models, the feature vector data of each model being indicative of a corresponding object of a number of objects, and further to compute, for each nearest neighbor point pair of the pluralities of nearest neighbor point pairs, a respective aligning transformation from the respective scene point pair to the nearest neighbor point pair, thereby defining a respective model-transformation combination for each nearest neighbor point pair, each model-transformation combination specifying the respective aligning transformation and the respective model with which the nearest neighbor point pair is associated. The processor is configured via execution of the voting instructions to increment, with each binning of a respective one of the model-transformation combinations, a respective bin counter for the model-transformation combination, and further to select a number of the model-transformation combinations in accordance with the bin counters to detect a number of the objects in the scene input and estimate a pose of each detected object.

In another aspect, an electronic device includes a camera to capture input image data, a three-dimensional sensing system to generate a mesh from the input image data, the mesh including a number of data points and respective surface normal data for each data point, a model database in which feature vector data for a number of models is stored, the feature vector data of each model being indicative of a corresponding object of a number of objects, and an object detection system coupled to the model database. The object detection system is configured to select a set of scene point pairs from the data points of the mesh. The object detection system includes a feature vector calculator configured to determine a respective feature vector for each scene point pair of the set of scene point pairs based on the respective surface normal data for the data points of the respective point pair, a matching engine configured to find, for each feature vector, a respective plurality of nearest neighbor point pairs in feature vector data of a number of models, the feature vector data of each model being indicative of a corresponding object of a number of objects, and further to compute, for each nearest neighbor point pair of the pluralities of nearest neighbor point pairs, a respective aligning transformation from the respective scene point pair to the nearest neighbor point pair, thereby defining a model-transformation combination for each nearest neighbor point pair, each model-transformation combination specifying the respective transformation and the respective model with which the nearest neighbor point pair is associated, and a voting engine configured to increment, with each binning of a respective one of the model-transformation combinations, a respective bin counter for the model-transformation combination, and further to select a number of the model-transformation combinations in accordance with the bin counters to detect a number of the objects in the scene input and estimate a pose of each detected object.

In yet another aspect, an electronic device includes a display, a processor coupled to the display, and one or more computer-readable storage media in which computer-readable instructions are stored such that, when executed by the processor, direct the processor to obtain a mesh for a scene input, select a set of scene point pairs of the mesh, determine a respective feature vector for each scene point pair of the set of scene point pairs, find, for each feature vector, a respective plurality of nearest neighbor point pairs in feature vector data of a number of models, the feature vector data of each model being indicative of a corresponding object of a number of objects, compute, for each nearest neighbor point pair of the pluralities of nearest neighbor point pairs, a respective aligning transformation from the respective scene point pair to the nearest neighbor point pair, thereby defining a model-transformation combination for each nearest neighbor point pair, each model-transformation combination specifying the respective aligning transformation and the respective model with which the nearest neighbor point pair is associated, increment, with each binning of a respective one of the model-transformation combinations, a respective bin counter for the model-transformation combination, select a number of the model-transformation combinations in accordance with the bin counters to detect a number of the objects in the scene input and estimate a pose of each detected object, and modify output data generated to direct rendering of images on the display in accordance with each detected object and the estimated pose of each detected object.

In still yet another aspect, a method includes obtaining a mesh for a scene input, selecting a set of scene point pairs of the mesh, determining a respective feature vector for each scene point pair of the set of scene point pairs, finding, for each feature vector, a respective plurality of nearest neighbor point pairs in feature vector data of a number of models, the feature vector data of each model being indicative of a corresponding object of a number of objects, computing, for each nearest neighbor point pair of the pluralities of nearest neighbor point pairs, a respective aligning transformation from the respective scene point pair to the nearest neighbor point pair, thereby defining a model-transformation combination for each nearest neighbor point pair, each model-transformation combination specifying the respective aligning transformation and the respective model with which the nearest neighbor point pair is associated, incrementing, with each binning of a respective one of the model-transformation combinations, a respective bin counter for the model-transformation combination, and selecting a number of the model-transformation combinations in accordance with the bin counters to detect a number of the objects in the scene input and estimate a pose of each detected object.

In connection with any one of the aforementioned aspects, the systems, devices, and/or methods described herein may alternatively or additionally include any combination of one or more of the following aspects or features. The processor is further configured via the execution of the matching instructions to access a search tree database in which the feature vector data is stored, and query the search tree database to determine the plurality of nearest neighbor point pairs based on a respective distance between the feature vector of the respective scene point pair and the feature vector data of each model. The feature vector is descriptive of local geometry at each point of the scene point pair in a translationally and rotationally invariant manner. The feature vector is rotationally invariant along a single axis, the single axis being a gravitational axis. Each feature vector includes a first element indicative of the length of a segment defined by the respective scene point pair, a second element indicative of an angle between a segment defined by the respective scene point pair and a gravitational axis, a third element indicative of an angle that specifies an azimuth of the surface normal vector at a first point of the respective scene point pair, a fourth element indicative of an angle that specifies an elevation of the surface normal vector at the first point, a fifth element indicative of an angle that specifies an azimuth of the surface normal vector at a second point of the respective scene point pair, and a six element indicative of an angle that specifies an elevation of the surface normal vector at the second point. The angles of the third through sixth elements are defined with respect to a coordinate system uniquely determined by the scene point pair. The system further includes a k-dimensional tree in which the feature vector data of the plurality of models is stored. Configuration instructions are stored in the memory, and the processor is configured via execution of the configuration instructions to adjust a distance value within which the feature vector data is searched to determine each nearest neighbor point pair. The processor is further configured via the execution of the feature vector instructions and/or the matching instructions to compute a canonical aligning transformation for each scene point pair of the set of point pairs based on oriented point pair data for each point pair. The processor is further configured via the execution of the matching instructions to compute the respective aligning transformation for the nearest neighbor point pair by computing a rigid aligning transformation that aligns the respective scene point pair and each corresponding nearest neighbor point pair based on the canonical aligning transformation of the scene point pair. The rigid aligning transformation is further based on a pre-computed canonical aligning transformation for each nearest neighbor point pair of the pluralities of nearest neighbor point pairs. The pre-computed canonical aligning transformation is based on oriented point pair data for each nearest neighbor point pair. The aligning transformation specifies a six-dimensional transformation such that the model-transformation combination is a seven-dimensional data point. The aligning transformation specifies translation along three axes and rotation about the three axes. Configuration instructions are stored in the memory, and the processor is configured via execution of the configuration instructions to establish the number of the plurality of nearest neighbor point pairs to be found for each scene point pair.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system comprising:
   a memory in which feature vector instructions, matching instructions, and voting instructions are stored; and
   a processor coupled to the memory, the processor configured via execution of:
   the feature vector instructions to select a set of scene point pairs of a scene input, and to determine a respective feature vector for each scene point pair of the set of scene point pairs;
   the matching instructions to find, for each feature vector, a respective plurality of nearest neighbor point pairs in feature vector data of a plurality of models, the feature vector data of each model being indicative of a corresponding object of a plurality of objects, and further to compute, for each nearest neighbor point pair of the pluralities of nearest neighbor point pairs, a respective aligning transformation from the respective scene point pair to the nearest neighbor point pair, thereby defining a respective model-transformation combination for each nearest neighbor point pair, each model-transformation combination specifying the respective model with which the nearest neighbor point pair is associated; and
   the voting instructions to detect an object in the scene input and estimate a pose of the detected object by accumulating votes for the model-transformation combinations.

2. The system of claim 1, wherein the processor is further configured via the execution of the matching instructions to:
   access a search tree database in which the feature vector data is stored; and
   query the search tree database to determine the plurality of nearest neighbor point pairs based on a respective distance between the feature vector of the respective scene point pair and the feature vector data of each model.

3. The system of claim 1, wherein the feature vector is descriptive of local geometry at each point of the scene point pair in a translationally and rotationally invariant manner.

4. The system of claim 3, wherein the feature vector is rotationally invariant along a single axis, the single axis being a gravitational axis.

5. The system of claim 1, wherein each feature vector comprises:
   a first element indicative of the length of a segment defined by the respective scene point pair;
   a second element indicative of an angle between a segment defined by the respective scene point pair and a gravitational axis;
   a third element indicative of an angle that specifies an azimuth of the surface normal vector at a first point of the respective scene point pair;

a fourth element indicative of an angle that specifies an elevation of the surface normal vector at the first point;
a fifth element indicative of an angle that specifies an azimuth of the surface normal vector at a second point of the respective scene point pair; and
a six element indicative of an angle that specifies an elevation of the surface normal vector at the second point.

6. The system of claim 5, wherein the angles of the third through sixth elements are defined with respect to a coordinate system uniquely determined by the scene point pair.

7. The system of claim 1, further comprising a k-dimensional tree in which the feature vector data of the plurality of models is stored.

8. The system of claim 7, wherein:
configuration instructions are stored in the memory; and
the processor is configured via execution of the configuration instructions to adjust a distance value within which the feature vector data is searched to determine each nearest neighbor point pair.

9. The system of claim 1, wherein:
the processor is further configured via the execution of the feature vector instructions and/or the matching instructions to compute a canonical aligning transformation for each scene point pair of the set of point pairs based on oriented point pair data for each point pair; and
the processor is further configured via the execution of the matching instructions to compute the respective aligning transformation for the nearest neighbor point pair by computing a rigid aligning transformation that aligns the respective scene point pair and each corresponding nearest neighbor point pair based on the canonical aligning transformation of the scene point pair.

10. The system of claim 9, wherein the rigid aligning transformation is further based on a pre-computed canonical aligning transformation for each nearest neighbor point pair of the pluralities of nearest neighbor point pairs, the pre-computed canonical aligning transformation being based on oriented point pair data for each nearest neighbor point pair.

11. The system of claim 1, wherein the aligning transformation specifies a six-dimensional transformation such that the model-transformation combination is a seven-dimensional data point.

12. The system of claim 1, wherein the aligning transformation specifies translation along three axes and rotation about the three axes.

13. The system of claim 1, wherein:
configuration instructions are stored in the memory; and
the processor is configured via execution of the configuration instructions to establish the number of the plurality of nearest neighbor point pairs to be found for each scene point pair.

14. An electronic device comprising:
a display;
a processor coupled to the display; and
one or more computer-readable storage media in which computer-readable instructions are stored such that, when executed by the processor, direct the processor to:
select a set of scene point pairs of a scene input;
determine a respective feature vector for each scene point pair of the set of scene point pairs;
find, for each feature vector, a respective plurality of nearest neighbor point pairs in feature vector data of a number of models, the feature vector data of each model being indicative of a corresponding object of a plurality of objects;
compute, for each nearest neighbor point pair of the pluralities of nearest neighbor point pairs, a respective aligning transformation from the respective scene point pair to the nearest neighbor point pair, thereby defining a model-transformation combination for each nearest neighbor point pair, each model-transformation combination specifying the respective model with which the nearest neighbor point pair is associated;
detect a number of the objects in the scene input and estimate a pose of each detected object by accumulating votes for the model-transformation combinations; and
modify output data generated to direct rendering of images on the display in accordance with each detected object and the estimated pose of each detected object.

15. The electronic device of claim 14, wherein the processor is further directed by the computer-readable instructions to:
compute a canonical aligning transformation for each scene point pair of the set of point pairs based on oriented point pair data for each point pair; and
compute the respective aligning transformation for the nearest neighbor point pair by computing a rigid aligning transformation that aligns the respective scene point pair and each corresponding nearest neighbor point pair based on the canonical aligning transformation of the scene point pair.

16. The electronic device of claim 15, wherein the rigid aligning transformation is further based on a pre-computed canonical aligning transformation for each nearest neighbor point pair of the pluralities of nearest neighbor point pairs based on oriented point pair data for each nearest neighbor point pair.

17. A method comprising:
selecting a set of scene point pairs of a scene input;
determining a respective feature vector for each scene point pair of the set of scene point pairs;
finding, for each feature vector, a respective plurality of nearest neighbor point pairs in feature vector data of a number of models, the feature vector data of each model being indicative of a corresponding object of a plurality of objects;
computing, for each nearest neighbor point pair of the pluralities of nearest neighbor point pairs, a respective aligning transformation from the respective scene point pair to the nearest neighbor point pair, thereby defining a model-transformation combination for each nearest neighbor point pair, each model-transformation combination specifying the respective model with which the nearest neighbor point pair is associated;
accumulating votes for the model-transformation combinations to detect a number of the objects in the scene input and estimate a pose of each detected object.

18. The method of claim 17, wherein finding the respective plurality of nearest neighbor point pairs comprises:
accessing a search tree database in which the feature vector data is stored; and
querying the search tree database to determine the plurality of nearest neighbor point pairs based on a respective distance between the feature vector of the respective scene point pair and the feature vector data of each model.

19. The method of claim 17, wherein the feature vector is descriptive of local geometry at each point of the scene point pair in a translationally and rotationally invariant manner.

20. The method of claim 17, the aligning transformation specifies translation along three axes and rotation about the three axes.

\* \* \* \* \*